United States Patent
Tsujita

(10) Patent No.: US 9,284,119 B2
(45) Date of Patent: Mar. 15, 2016

(54) LOGISTICS SYSTEM, AND METHOD FOR RECOVERY FROM ABNORMALITY IN LOGISTICS SYSTEM

(75) Inventor: Akihiro Tsujita, Inuyama (JP)

(73) Assignee: MURATA MACHINERY, LTD., Kyoto (JP)

(*) Notice: Subject to any disclaimer, the term of this patent is extended or adjusted under 35 U.S.C. 154(b) by 0 days.

(21) Appl. No.: 14/345,957

(22) PCT Filed: Jul. 23, 2012

(86) PCT No.: PCT/JP2012/068578
§ 371 (c)(1),
(2), (4) Date: Mar. 20, 2014

(87) PCT Pub. No.: WO2013/042447
PCT Pub. Date: Mar. 28, 2013

(65) Prior Publication Data
US 2014/0229001 A1    Aug. 14, 2014

(30) Foreign Application Priority Data
Sep. 22, 2011   (JP) .................................. 2011-207322

(51) Int. Cl.
G06F 7/00       (2006.01)
B65G 1/137      (2006.01)
G05B 19/418     (2006.01)
G06Q 10/08      (2012.01)

(52) U.S. Cl.
CPC .......... *B65G 1/137* (2013.01); *G05B 19/41895* (2013.01); *G06Q 10/087* (2013.01); *Y02P 90/285* (2015.11)

(58) Field of Classification Search
CPC ............ H01L 21/681; H01L 21/67259; H01L 21/67276
USPC .......................................................... 700/218
See application file for complete search history.

(56) References Cited

U.S. PATENT DOCUMENTS

| | | | |
|---|---|---|---|
| 2008/0035449 A1* | 2/2008 | Lee ................... | H01L 21/67727 198/349 |
| 2010/0082151 A1* | 4/2010 | Young .................... | G06Q 10/08 700/226 |
| 2011/0060449 A1* | 3/2011 | Wurman ............ | G05B 19/4189 700/218 |

FOREIGN PATENT DOCUMENTS

| JP | 08-067314 A | 3/1996 |
|---|---|---|
| JP | 2000-309408 A | 11/2000 |

OTHER PUBLICATIONS

Official Communication issued in International Patent Application No. PCT/JP2012/068578, mailed on Aug. 21, 2012.

*Primary Examiner* — Kyle Logan
(74) *Attorney, Agent, or Firm* — Keating & Bennett, LLP

(57) ABSTRACT

A logistics system includes a transport device and a controller and stores inventory data of objects. The logistics system stores the inventory data in a storage unit, data on objects being transported by the transport device in a transport data storage unit, and recovery procedures for the transport device in a recovery procedure storage unit. When an abnormality detector detects an abnormality relating to the transport device, the recovery procedure for the detected abnormality is read out from the recovery procedure storage unit, and input is received for a recovery procedure to be carried out. Instructions are outputted to the transport device in accordance with the inputted recovery procedure, and storage of the inventory data is updated according to the received recovery procedure and data on objects being transported in the transport data storage.

9 Claims, 7 Drawing Sheets

F I G. 5

F I G. 6
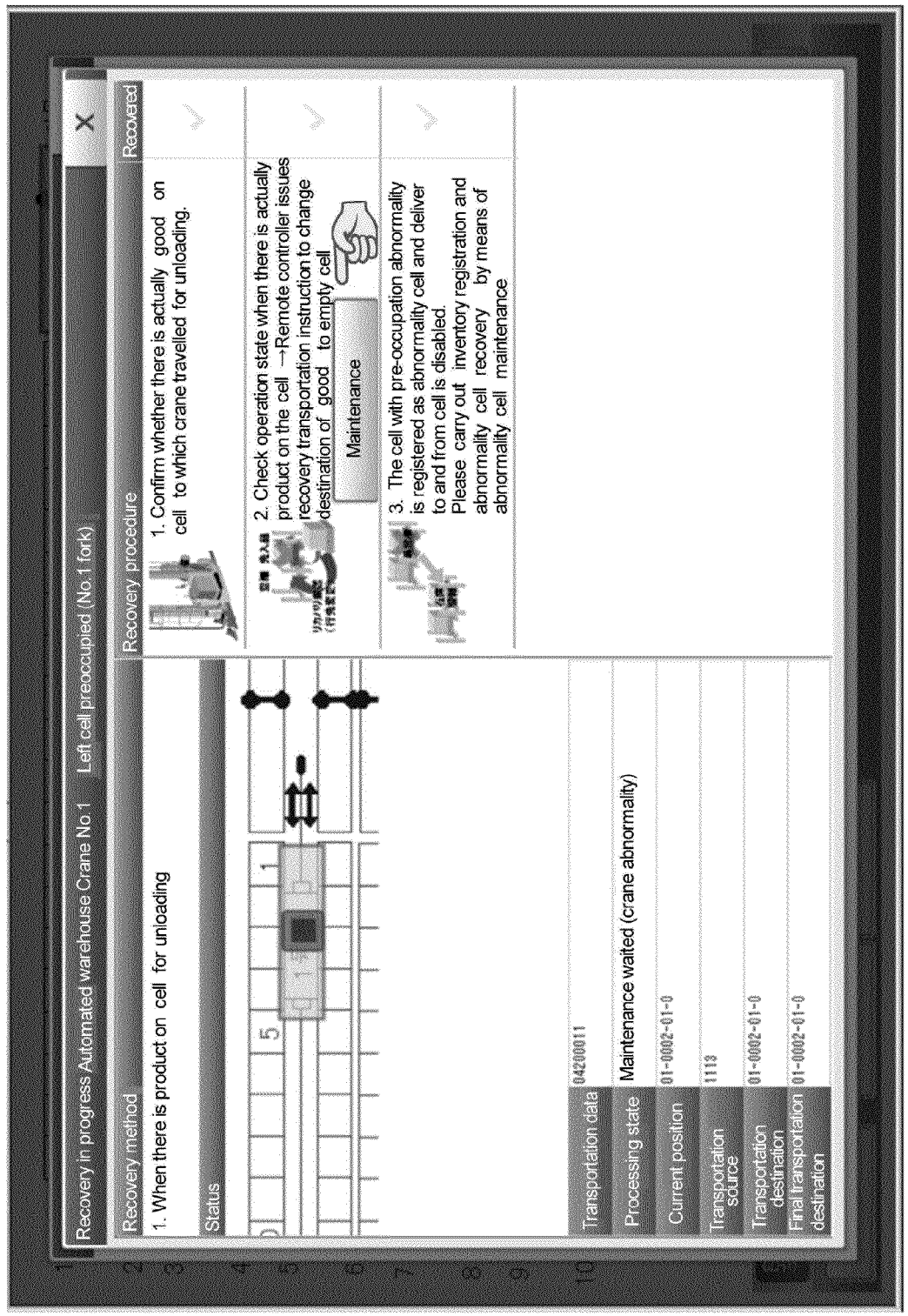

LOGISTICS SYSTEM, AND METHOD FOR RECOVERY FROM ABNORMALITY IN LOGISTICS SYSTEM

BACKGROUND OF THE INVENTION

1. Field of the Invention

The present invention relates to recovery from abnormalities in a logistics system.

2. Description of the Related Art

In a logistics system, objects are transported by transport devices, such as stacker cranes, transport vehicles, loading and unloading conveyors, automated forklifts, and automated guided vehicles, and the like. JP2000-309408A discloses displaying occurrence locations of abnormalities on a monitor, and displaying a method of dealing with the abnormalities on the monitor. According to the method described in JP2000-309408A, a logistics system may be recovered with respect to hardware aspects in accordance with the display on the monitor.

If an abnormality related to the transport device occurs, it may become impossible to carry out the initially planned transport tasks. For example, when loading an object into a cell on a shelf from a station is planned, it may be impossible to load the object due to the fact that the destination cell is preoccupied by another object. This abnormality is called a preoccupation abnormality. If there is actually a preoccupation object, then the object has to be unloaded into another cell, but this work is carried out outside the framework of the normal control performed with the controller of the logistics system. Therefore, if the unloading destination of the object is changed with the recovery operation, the inventory data is not changed automatically. Therefore, although a recovery in terms of "hardware" aspects has been possible, a secondary problem may occur in that data, etc., due to the fact that the storage position of the object is not changed in accordance with the recovery operation. Since the operator concentrates on the hardware recovery and tends to forget about changing the inventory data, etc., problems of this kind are liable to occur.

SUMMARY OF THE INVENTION

Preferred embodiments of the present invention enable a logistics system to recover readily from an abnormality and enable inventory data to be changed reliably in accordance with an operation to recover from an abnormality.

A logistics system according to a preferred embodiment of the present invention is provided with a transport device and a controller which is configured and programmed to store inventory data of objects. The system includes an inventory data storage unit, a transport data storage unit that stores data about objects being transported by the transport device, a recovery procedure storage unit that stores predetermined procedures for recovery from abnormalities relating to the transport device, an abnormality detection unit that detects abnormalities relating to the transport device, a receiving unit that reads out recovery procedures to detected abnormalities from the recovery procedure storage unit and receives inputs of recovery procedures to be executed, an instruction unit that outputs instructions to the transport device based on the received recovery procedures, and an updating unit that updates storage in the inventory data storage unit based on the received recovery procedures and the data stored in the transport data storage unit about the objects being transported.

Furthermore, a method of recovery from abnormality according to another preferred embodiment of the present invention in a logistics system which is provided with a transport device and a controller and configured and programmed to store inventory data of objects. The method includes the steps of storing inventory data in a storage unit, storing in a transport data unit data about objects being transported by the transport device, storing in a recovery procedure storage unit predetermined procedures for recovery from abnormalities relating to the transport device, detecting with an abnormality detection unit abnormalities relating to the transport device, reading out recovery procedures for detected abnormalities from the recovery procedure storage unit and receiving with a receiving unit input of recovery procedures to be executed, outputting with an instruction unit an instruction to the transport device based on the received recovery procedure, and updating with the updating unit storage of the inventory data in the storage unit based on the received recovery procedures and the data about the objects being transported stored in the transport data storage unit. There are orders in which these steps occur inevitably during processing, but apart from this, the steps may be executed in any order. The first three steps are preferably executed before detecting an abnormality, and the last two steps are preferably executed after inputting a recovery procedure, for example.

In this specification, the description relating to the logistics system corresponds directly to the method of recovery from abnormality in a logistics system, and conversely the description relating to a method of recovery from abnormality in a logistics system corresponds directly to a logistics system. Furthermore, apart from abnormality in the transport device itself, an abnormality relating to a transport device also includes abnormalities relating to transport operations being executed by the transport device, such as the fact that there is a preoccupation object in the shelf cell where the transport device is seeking to unload an object. The abnormality relating to the transport device may simply be called "abnormality", and in principle there are a plurality of recovery procedures relating to an abnormality.

In various preferred embodiments of the present invention, if an abnormality relating to a transport device occurs, a recovery procedure stored in the recovery procedure storage unit is read out, an operator inputs which recovery procedure is to be executed, and this input is received by the receiving unit. According to the recovery procedure received in this way, instructions are issued to the transport device by the instruction unit to cause the transport device to carryout actions in accordance with the recovery procedure. As a result, it is possible to recover a logistics system from abnormality in terms of "hardware" aspects. Since the transport device is recovered with an operation different from normal procedures, the logistics system is recovered with respect to hardware aspects, the data on the object being transported preferably remains unchanged and is not changed to the correct data. Since the storage in the inventory data storage unit is updated, on the basis of the received recovery procedure and the data about the object being transported stored in the transport data storage unit, the inventory data is also recovered accurately and reliably, in various preferred embodiments of the present invention. If the recovery procedure has been selected and there is data on the object being transported, then it is possible to decide how to process the object, for example, what position to change the transport destination to, and consequently, it is possible to recover the inventory data.

Preferably, the controller is provided with a monitor and a drive unit for the monitor, and the drive unit displays configurations of the logistics system on the monitor so as to show transport devices and the presence or absence of an abnormality therein, and when a transport device having an abnormality is designated by an operator on the monitor, recovery procedures for the abnormality in the designated transport device are displayed on the monitor. Thus, by designating a transport device having an abnormality with a mouse, or the like, on a monitor, it is possible to display a recovery procedure on a monitor. Furthermore, even if abnormalities occur in transport devices simultaneously, it is possible readily to display, on the monitor, recovery procedures for the transport devices that are to be recovered.

Preferably, the transport device is provided with a sensor that detects objects, and the updating unit is configured to confirm positions of transport destinations of objects being transported by signals from the sensor, when updating the storage of the inventory data in the storage unit. The sensor is, for example, a preoccupation sensor that detects objects in cells, or a sensor that detects objects on the transport device, or the like. It is possible to estimate the position to which the object has been transported, from the recovery procedure and data on the object being transported. With these sensors, it is possible to confirm whether the objects have been transported to the positions instructed by the instruction unit. Consequently, the destinations of the objects may be confirmed, when the objects are unloaded from the transport device to cells, or the like, with the abnormality recovery procedure.

Preferably, the transport devices are provided with, as the sensor, a transport object sensor that detects objects on the transport device, and a preoccupation sensor that detects objects at the positions of the transport destinations from the transport devices; and the logistics system is configured and programmed to confirm that the objects have been transported to the positions of the transport destinations, based on a condition that the transported object sensor does not detect the objects and the preoccupation sensor detects the objects. By this configuration, it is possible to confirm that an object has actually been transported to a provisional transport destination, if the object is to be transported to a provisional transport destination in order to recover from an abnormality.

Further preferably, the transport devices preferably are further provided with a camera to capture images of the positions of the transport destinations, and the logistics system is configured to display the images from the camera on the monitor. By this configuration, it is possible to readily confirm the status of the transport destination, if an abnormality has occurred such that, for instance, an object cannot be transported to the transport destination. Consequently, when selecting the recovery procedure, for example, it is possible to make an appropriate choice.

Preferably, a shelf including a plurality of cells into which the transport devices deliver objects is further provided, the preoccupation sensor detects objects in the cells, and the camera captures images of the shelf. For example, if the preoccupation sensor detects that there is already another object in the cell, then by looking at the image from the camera on the monitor, an operator may readily ascertain the actual status of the cell.

Most preferably, a plurality of recovery procedures are stored in the recovery procedure storage unit, and the plurality of recovery procedures are displayed on the monitor together with the images of the shelf from the camera, and the receiving unit is configured to receive a selection of a recovery procedure to be executed, from the plurality of recovery procedures. With this configuration, it is possible to select an appropriate recovery procedure while checking the status of the shelf on the monitor.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a diagram showing an abnormality display screen, which depicts recovery procedures of three types.

FIG. 6 is a diagram showing a procedure for recovery from an abnormality when there is a preoccupation object.

DETAILED DESCRIPTION OF THE PREFERRED EMBODIMENTS

Preferred embodiments of the present invention are described below. The scope of the present invention should be determined by the understanding of a person skilled in the art, taking into account the description and well-known technology in this field, on the basis of the wording and the scope of the claims.

Figure 1:
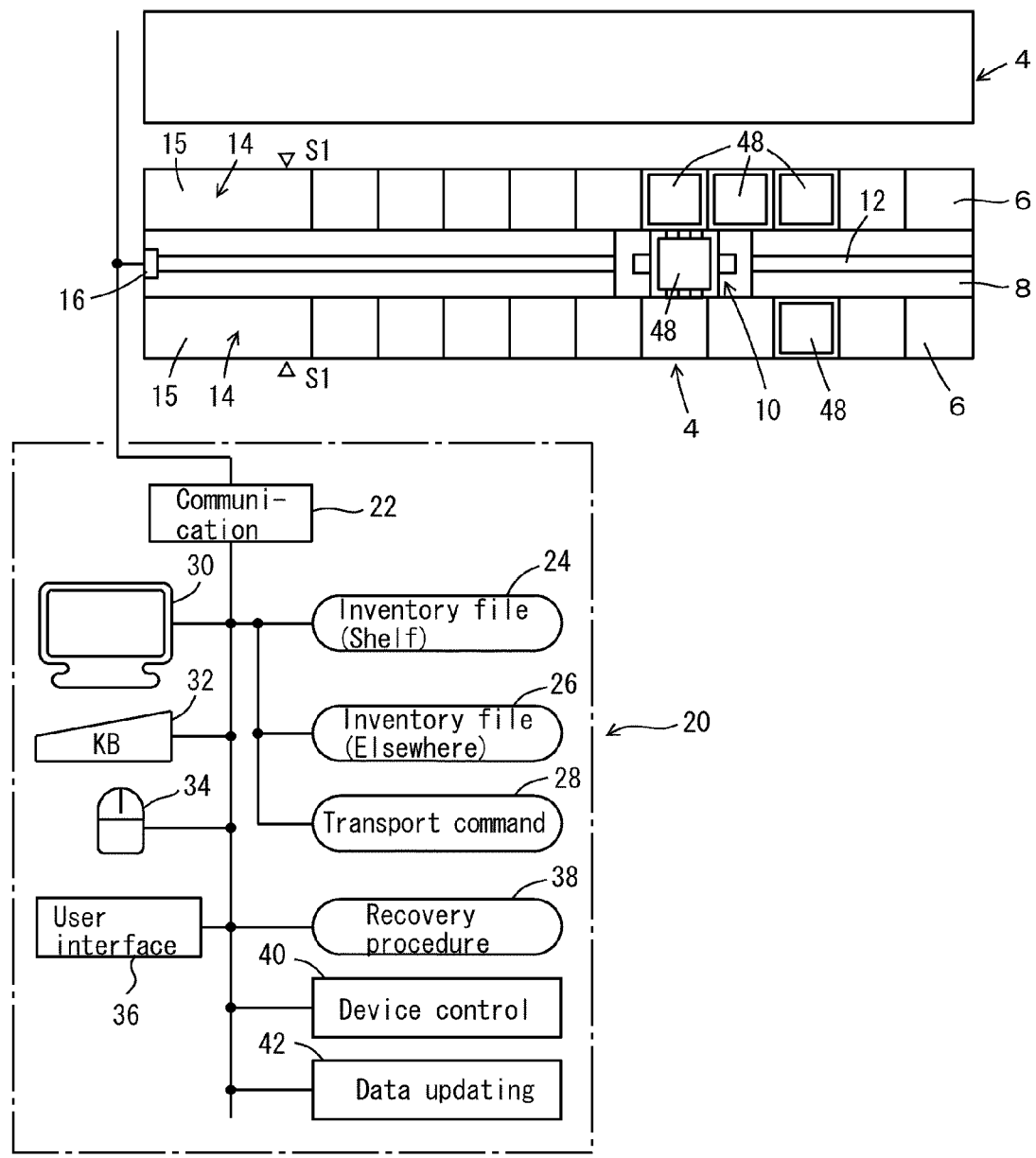
FIG. 1 is a block diagram of a logistics system according to a preferred embodiment of the present invention.

FIG. 1 to FIG. 7 show a logistics system 2 and a method of recovery from abnormality therein, according to preferred embodiments of the present invention. In FIG. 1, automated warehouse units 4 are provided in a parallel arrangement, for example. But a logistics system may also be constituted by one automated warehouse unit 4, for example. The automated warehouse unit 4 is provided with a pair of shelves 6, the left and right pair, and a transport device, such as a stacker crane 10, etc., that travels in the travel space 8 between the shelves 6. The stacker crane 10 includes a travel rail 12. Any type of transport device may be provided; for instance, it is possible to use transport vehicles, or the like, which are provided for each height level of the shelves 6. 14 denotes loading and unloading stations, which are provided with a conveyor 15, this conveyor 15 being a further example of the transport device, and apart from this, it is also possible to include automated transport vehicles, automated forklifts, or the like, as the transport device. A ground-based control panel 16 controls the conveyor 15 of the loading and unloading station 14, and the stacker crane 10.

A controller 20 is configured and programmed to control the whole of the logistics system 2, and to communicate with the ground-based control panel 16 via a LAN, or the like. In the case of a logistics system including an automated warehouse unit 4 only, the controller is provided inside the ground-based control panel 16. A communications unit 22 communicates with the ground-based control panel 16. Inventory file storage units 24 and 25 are provided. The inventory file storage unit 24 stores the inventory on the shelves 6, for example, the presence or absence of an object, the object ID, and so on, for each cell in the shelves 6. The storage unit 26 stores the inventory for positions other than the shelves 6, for example, the inventory of objects on the stacker crane 10 and the loading and unloading stations 14. In the storage unit 26, the inventory data is stored in the form of data about the object position, object ID, transport destination, and so on, and the storage unit 26 is an example of transport data storage unit. The transport instruction storage unit 28 stores transport instructions to the stacker crane 10, etc., and the contents thereof include the transport destinations of the objects (shelf cells or station 14) from the object transport sources (shelf cells or station 14), the IDs of the objects being transported, and the execution status of the transport instructions. The transport sources and transport destinations are represented by the addresses of shelf cells, the address of a station 14, or the like. Completed transport instructions preferably are stored in a log file, or the like, which is not illustrated.

A color monitor 30, 32 denotes a keyboard, and 34 denotes a mouse, but instead of the mouse 34, it is possible to use a joystick or tracker ball, or the like, by clicking with the mouse 34 on a suitable position on the monitor 30, an operator may supply an instruction to the controller 20. A user interface 36, which creates a display screen on the monitor 30, and also interprets inputs from the mouse 34, keyboard 32, and the like, to generate instructions for other portions of the controller 20. A recovery procedure storage unit 38, which stores predetermined recovery procedures for abnormalities in the respective transport devices, such as the stacker crane 10, conveyor 15, or the like, and generally stores a plurality of recovery procedures for one type of abnormality. The device control unit 40 is configured and programmed to control the conveyor 15, the stacker crane 10, and the like, and in the event of recovery from an abnormality, controls the transport devices in accordance with the selected recovery procedure. The data updating unit 42 updates the data in the inventory file storage units 24, 26, the transport instruction storage unit 28, and so on, and in particular, updates the data in the storage units 24 to 28 based on the selected recovery procedure in the event of recovery from abnormalities and instruction data to the transport device, such as the unloading destinations of objects, and the like.

Figure 2:
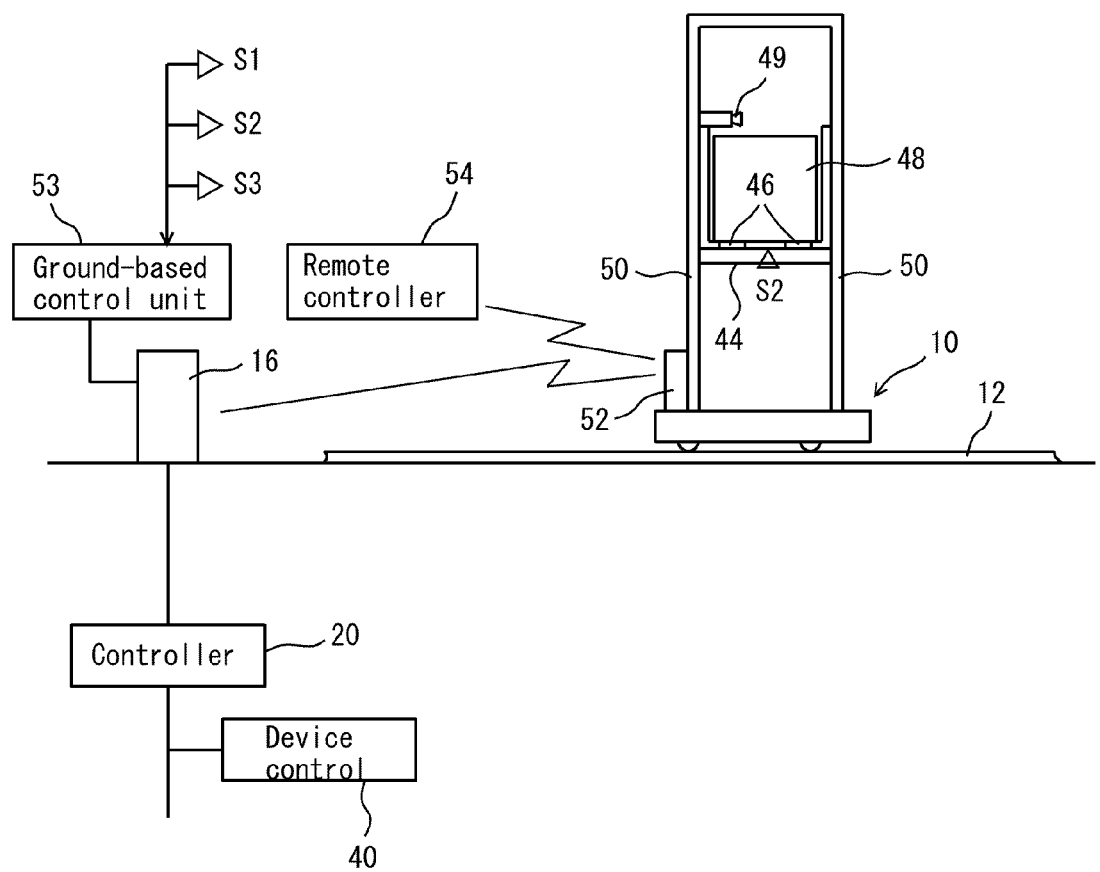
FIG. 2 is a diagram showing relationship between control units of a stacker crane in a preferred embodiment of the present invention.
Figure 3:
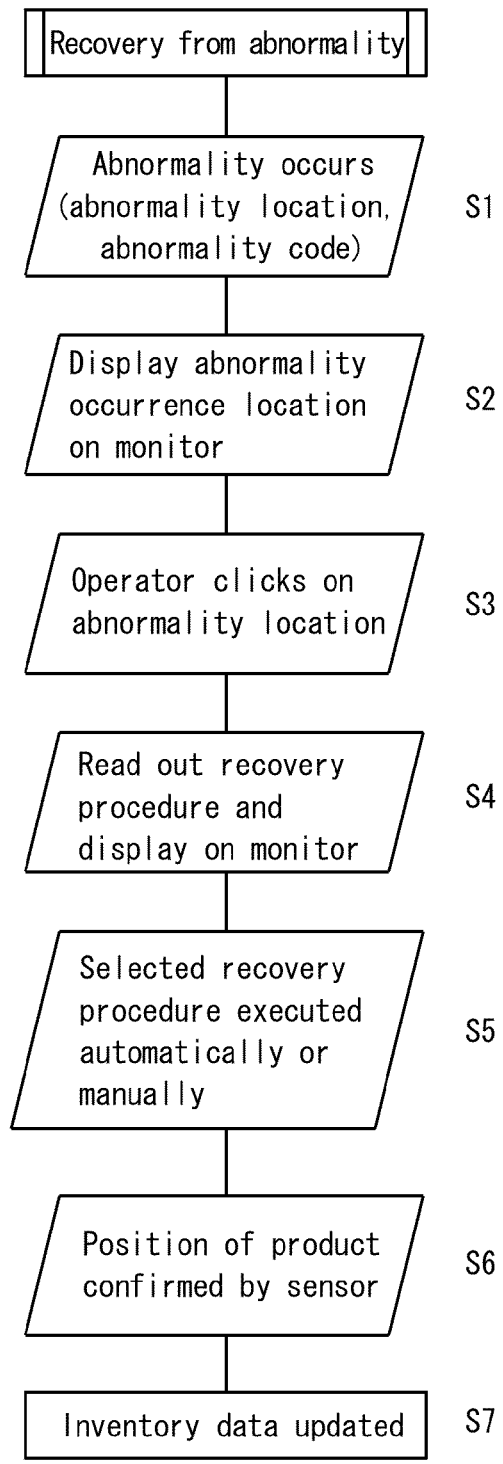
FIG. 3 is a flowchart showing an algorithm for recovery from abnormalities in a preferred embodiment of present invention.

FIG. 2 shows a relationship between a stacker crane 10, a ground-based control panel 16 and a controller 20. Regarding the control of the stacker crane 10, normally, an instruction to an onboard control panel 52 is sent from the device control unit 40 of the controller 20, via a ground-based control unit 53 of the ground-based control panel 16. The onboard control panel 52 controls a travel motor, an elevation motor, a loading motor, and the like, which are not illustrated, so as to operate the stacker crane 10. Apart from this, an operation instruction is also issued to the stacker crane 10 by a remote controller 54, and an operator standing inside the travel space 8 may use the remote controller 54 to issue instructions from the vicinity of the stacker crane 10. If the stacker crane 10 is operated by instructions from the ground-based control unit 53 or the remote controller 54, then the controller 20 does not issue instructions.

The stacker crane 10 is provided with an elevation platform 44, an object 48 is loaded thereon by a sliding fork 46, or the like, on the elevation platform 44, and the elevation platform 44 is raised and lowered along a mast 50. Furthermore, a camera 49 is provided on the elevation platform 44 to capture images of the left and right shelves, etc., object sensors S2, S3 are provided on the elevation platform 44, and, for example, an object 48 on the elevation platform 44 is detected by the object sensor S2, and preoccupation objects on the cells to the left and right of the elevation platform 44 are detected by the object sensor S3. Moreover, an object sensor S1 is provided in the loading and unloading station 14 in FIG. 1 and the presence or absence of an object 48 is thus detected.

Figure 4:
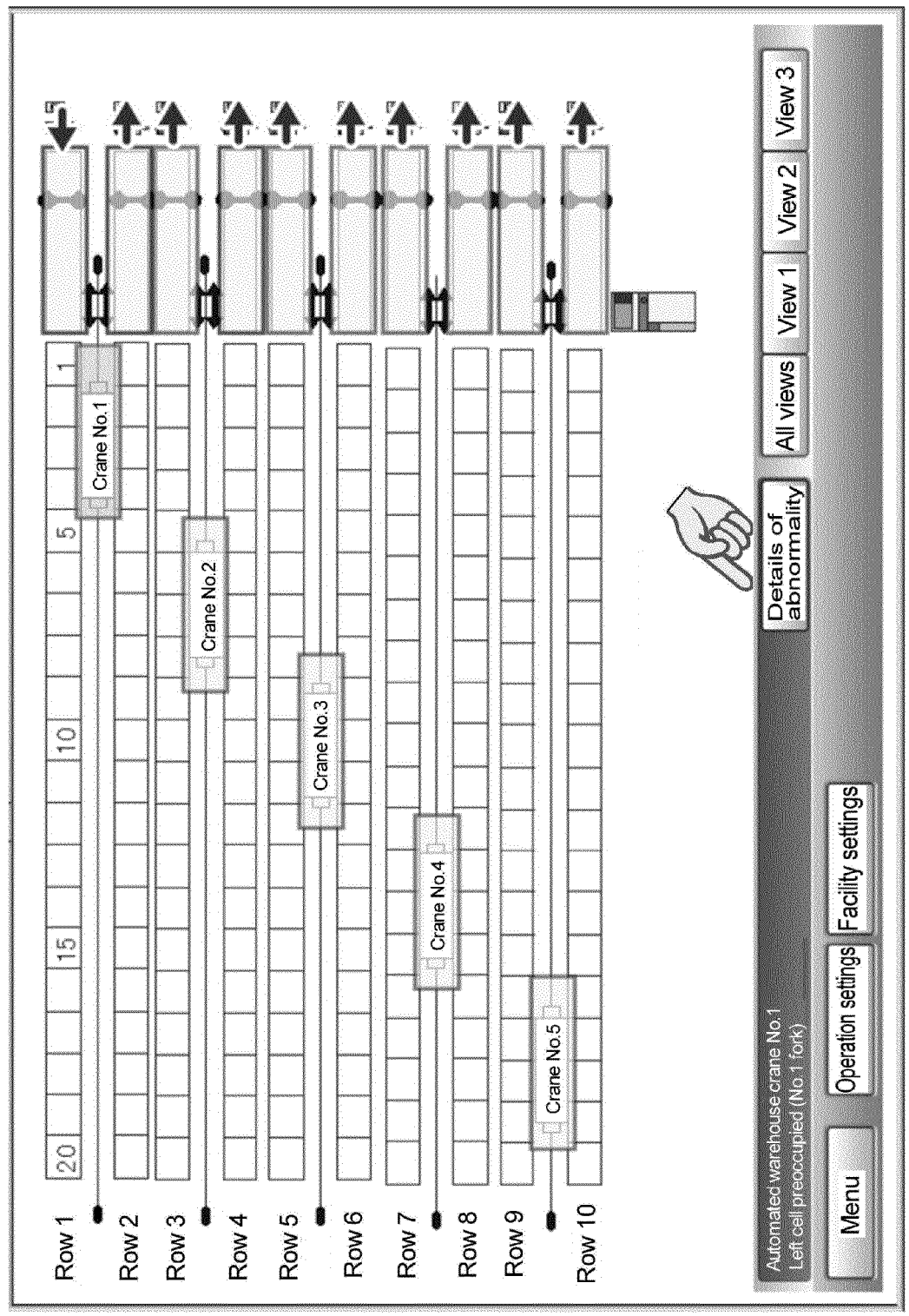
FIG. 4 is a diagram showing an abnormality display screen, depicting a stacker crane in which an abnormality has occurred, separately from other devices.

FIG. 3 to FIG. 7 show a recovery procedure from abnormalities. If an abnormality occurs, the object sensors S1 to S3, etc., detect the abnormality and input this to the controller 20 via the communications unit 22. The controller 20 specifies an abnormality occurrence location and assigns an abnormality code, depending on which sensor the abnormality is received from (step 1). The user interface 36 of the controller 20 displays the occurrence location of the abnormality on the monitor 30 (step 2). In this case, as shown in FIG. 4, for example, the display shows a left-side cell preoccupation abnormality (that the object cannot be unloaded because there is a preoccupation object in the left-side cell), on the No. 1 stacker crane.

Figure 5:
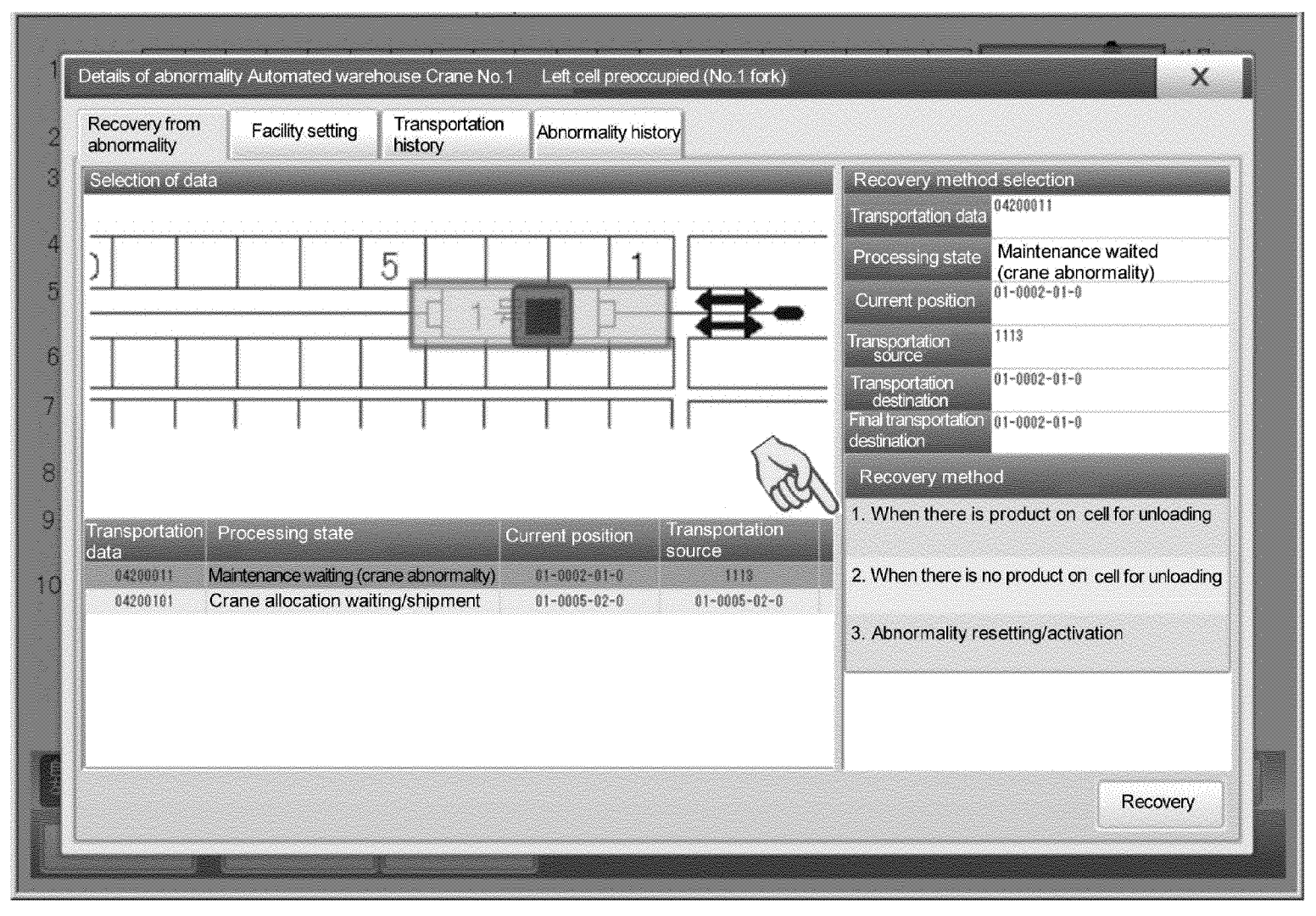

On the display in FIG. 4, when the operator clicks with the mouse, or the like, on the icon which represents the No. 1 stacker crane, then the display changes to that shown in FIG. 5, and shows only the transport device relating to the abnormality, and the area surrounding same, rather than the whole of the logistics system. In this case, the transport data (transport instruction) relating to an abnormality is "04200011", the type of abnormality is "crane abnormality", and it can be seen that, with this transport instruction, the object has been transported from the transport source address "1113" to the current location address "01-0002-01-0". Recovery procedures of three kinds are displayed: if there is actually a preoccupation on the destination shelf, if there is actually no preoccupation object on the destination shelf, and when the stacker crane No. 1 is reset and restarted due to an abnormality (step 3).

For instance, here, if the recovery procedure 1 is selected, in which there is actually a preoccupation object, then the screen in FIG. 6 is shown, the image of the camera 49 of the elevation platform 44 is displayed on the monitor, and the operator confirms the presence or absence of the preoccupation object. If there is a preoccupation object, then status on empty cells is selected with reference to the operating status, or the like, and an empty cell is designated as the destination for unloading the object being transported (step 4). As a countermeasure in response to the preoccupation object, the cell is registered as an abnormal cell, and the inventory data is updated in such a manner that the preoccupation object is registered in the inventory, with an abnormal cell maintenance process. The abnormal cell maintenance is a separate process from recovery from abnormality.

If there is actually a preoccupation object, then the object is unloaded on a designated empty cell, under the control of the controller 20, or the like (step 5), for example. It is then confirmed, by the object sensors S2, S3, etc. that the object has been unloaded onto the designated cell (step 6). The position where the object is actually unloaded is ascertained by an input on the screen in FIG. 6, and the fact that it has actually been unloaded at that position is also confirmed by the sensors S2, S3. Furthermore, the object ID, and the like, is stored in the inventory file storage unit 26. This data is used to update the inventory file storage unit 24, and the inventory on the stacker crane in the inventory file storage unit 26 is erased (step 7). Moreover, the transport instruction storage unit 28 also stores the fact that the transport destination of the object has been updated due to the abnormality. By this procedure, it is possible to update data for an object being transported correctly, simultaneously with the recovery from the abnormality.

Figure 7:
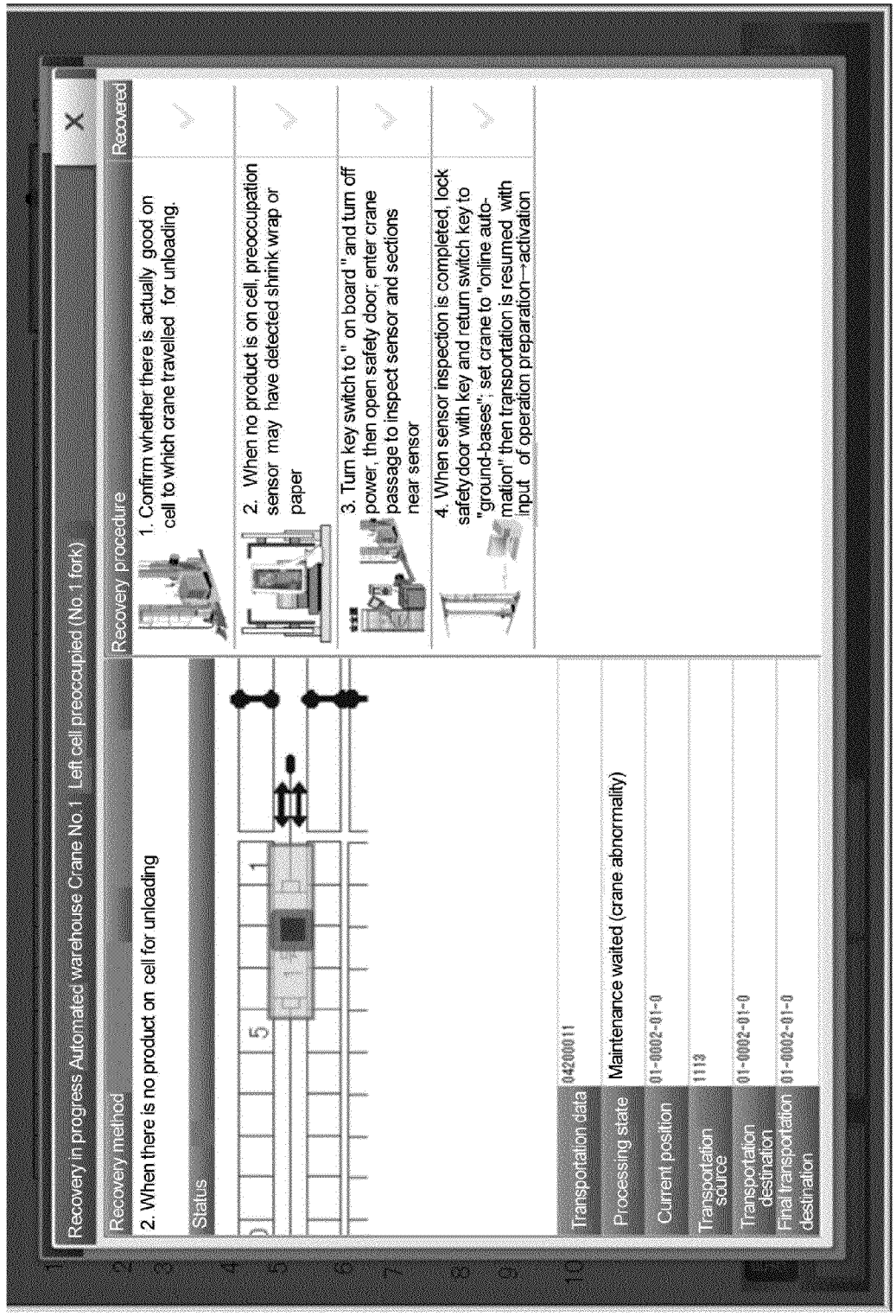
FIG. 7 is a diagram showing a procedure for recovery from an abnormality when there is no preoccupation object.

If the recovery procedure 2 is selected, which is a case where there is actually no preoccupation object, then the display in FIG. 7 is shown, and in this case also, it is confirmed whether or not there actually is a preoccupation object. Since a shrink-wrap film or a paper, or the like, can be envisaged as a cause of erroneous detection of a preoccupation object, the control of the stacker crane is shifted to a remote controller, in such a manner that the stacker crane is not operated inadvertently under the control of the controller 20. An operator then enters into the travel space of the crane, inspects the peripheral area of the sensor, and removes the shrink wrap, and the like. Thereupon, when the control of the stacker crane is transferred to the controller 20, the controller 20 causes the object to be unloaded at the initial unloading destination in the transport instruction, and recovery is terminated. In this case, the inventory data is updated by the transport instruction.

The following beneficial effects are achieved by the present preferred embodiment of the present invention.

A transport device in which an abnormality has occurred is displayed, and when an operator clicks on this transport device on a monitor, abnormality recovery procedures are displayed.

When a recovery procedure is selected from the displayed recovery procedures, the details of the selected recovery procedure are displayed. The operator carries out a recovery in terms of "hardware" aspects by carrying out tasks in accordance with the recovery procedure, and the like.

The transport destinations of the objects, etc., may change due to the recovery procedures, but since the inventory file storage unit 24, and the like, is updated accordingly, then there is no occurrence of secondary inconsistencies from "software" aspects.

If the transport destinations of the objects, etc., are changed, then the fact that the objects have been unloaded at the changed transport destinations is confirmed by object sensors, and therefore, the inventory file is updated more reliably.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

EXPLANATION OF REFERENCE NUMERALS

2 logistics system
4 automated warehouse unit
6 shelf
8 travel space
10 stacker crane
12 travel rail
14 loading and unloading station
15 conveyor
16 ground-based control panel
20 controller
22 communications unit
24, 26 inventory file storage unit
28 transport instruction storage unit
30 monitor
32 keyboard
34 mouse
36 user interface
38 recovery procedure storage unit
40 device control unit
42 data updating unit
44 elevation platform
46 slide fork
48 object
49 camera
50 mast
52 onboard control panel
53 ground-based control unit
54 remote controller
S1-S3 object sensor

What is claimed is:

1. A logistics system comprising:
at least one transport device; and
a controller which is configured and programmed to store inventory data about objects;
an inventory data storage unit;
a transport data storage unit that stores data about objects being transported by the at least one transport device;
a recovery procedure storage unit that stores predetermined procedures for recovery from abnormalities relating to the at least one transport device;
an abnormality detection unit that detects abnormalities relating to the at least one transport device;
a receiving unit that reads out recovery procedures relating to detected abnormalities from the recovery procedure storage unit and that receives inputs of recovery procedures to be executed;
an instruction unit that outputs instructions to the at least one transport device based on the received recovery procedures; and
an updating unit that updates storage in the inventory data storage unit based on the received recovery procedures and the data stored in the transport data storage unit about the objects being transported; wherein
the at least one transport device includes at least one transport vehicle;
the at least one transport vehicle travels along a travel rail;
the at least one transport device is provided with a sensor that detects objects and the updating unit is configured to confirm positions of transport destinations of objects being transported by signals from the sensor, when updating the storage of the inventory data in the storage unit;
the at least one transport device is provided with, as the sensor, a transport object sensor that detects objects on the at least one transport device, and a preoccupation sensor that detects objects at the positions of the transport destinations from the at least one transport device; and
the logistics system is configured and programmed to confirm that the objects have been transported to the positions of the transport destinations based on a condition that the transport object sensor does not detect the objects and the preoccupation sensor detects the objects.

2. The logistics system according to claim 1, wherein the at least one transport device is provided with a sensor that detects objects, and the updating unit is configured to confirm positions of transport destinations of objects being transported by signals from the sensor, when updating the storage of the inventory data in the storage unit.

3. The logistics system according to claim 1, wherein:
the recovery procedure storage unit stores a plurality of predetermined procedures for recovery from abnormalities relating to the at least one transport device; and
the receiving unit reads out at least one of the predetermined procedures from the recovery procedure storage unit.

4. The logistics system according to claim 1, wherein the controller is provided with a monitor and a drive unit for the monitor, and the drive unit displays configurations of the logistics system on the monitor so as to show the at least one transport device and presence or absence of an abnormality therein, and when the at least one transport device has an abnormality and is designated by an operator on the monitor, recovery procedures for the abnormality in the at least one transport device having the abnormality are displayed on the monitor.

5. The logistics system according to claim 4, wherein the at least one transport device is provided with a camera that captures images of the positions of the transport destinations, and the logistics system is configured and programmed to display the images from the camera on the monitor.

6. The logistics system according to claim 5, further comprising a shelf including a plurality of cells into which the at least one transport device delivers objects, wherein the preoccupation sensor detects objects in the cells, and the camera captures images of the shelf.

7. The logistics system according to claim 6, wherein
a plurality of recovery procedures are stored in the recovery procedure storage unit, and the plurality of recovery procedures are displayed on the monitor together with the images of the shelf from the camera; and
the receiving unit is configured to receive a selection of a recovery procedure to be executed, from the plurality of recovery procedures.

8. A method of recovering from an abnormality in a logistics system provided with at least one transport device and a controller and configured to store inventory data of objects, the method comprising the steps of:
storing inventory data in a storage unit;
storing in a transport data storage unit data about objects being transported by the at least one transport device;
storing in a recovery procedure storage unit predetermined procedures for recovery from abnormalities relating to the at least one transport device;
detecting with an abnormality detection unit abnormalities relating to the at least one transport device;
reading out recovery procedures for detected abnormalities from the recovery procedure storage unit and receiving, with a receiving unit, input of recovery procedures to be executed;
outputting with an instruction unit an instruction to the at least one transport device based on the received recovery procedure; and
updating with an updating unit storage of the inventory data in the storage unit based the received recovery procedures and the data about the objects being transported stored in the transport data storage unit; wherein
the at least one transport device includes at least one transport vehicle;
the at least one transport vehicle travels along a travel rail;
the step of updating the storage of the inventory data in the storage unit includes confirming positions of transport destinations of objects being transported by signals from a sensor that detects objects and is provided in the at least one transport device;
the at least one transport device is provided with, as the sensor, a transport object sensor that detects objects on the at least one transport device, and a preoccupation sensor that detects objects at the positions of the transport destinations from the at least one transport device; and
the method further comprises a step of confirming that the objects have been transported to the positions of the transport destinations based on a condition that the transport object sensor does not detect the objects and the preoccupation sensor detects the objects.

9. A logistics system comprising:

at least one transport device; and a controller which is configured and programmed to store inventory data about objects;

an inventory data storage unit;

a transport data storage unit that stores data about objects being transported by the at least one transport device;

a recovery procedure storage unit that stores predetermined procedures for recovery from abnormalities relating to the at least one transport device;

an abnormality detection unit that detects abnormalities relating to the at least one transport device;

a receiving unit that reads out recovery procedures relating to detected abnormalities from the recovery procedure storage unit and that receives inputs of recovery procedures to be executed;

an instruction unit that outputs instructions to the at least one transport device based on the received recovery procedures; and an updating unit that updates storage in the inventory data storage unit based on the received recovery procedures and the data stored in the transport data storage unit about the objects being transported; wherein the at least one transport device includes at least one transport vehicle;

the controller is provided with a monitor and a drive unit for the monitor, and the drive unit displays configurations of the logistics system on the monitor so as to show the at least one transport device and presence or absence of an abnormality therein, and when the at least one transport device has an abnormality and is designated by an operator on the monitor, recovery procedures for the abnormality in the at least one transport device having the abnormality are displayed on the monitor;

the at least one transport device is provided with a sensor that detects objects, and the updating unit is configured to confirm positions of transport destinations of objects being transported by signals from the sensor, when updating the storage of the inventory data in the storage unit;

the at least one transport device is provided with, as the sensor, a transport object sensor that detects objects on the at least one transport device, and a preoccupation sensor that detects objects at the positions of the transport destinations from the at least one transport device; and the logistics system is configured and programmed to confirm that the objects have been transported to the positions of the transport destinations based on a condition that the transported object sensor does not detect the objects and the preoccupation sensor detects the objects.

* * * * *